Figure 1:
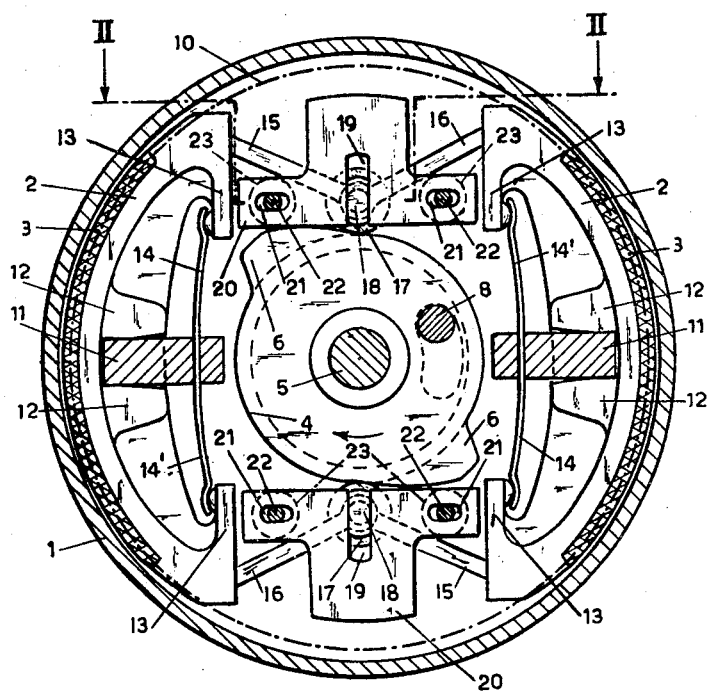

INVENTOR
ARIE VAN DER PLAS

United States Patent Office 2,995,217
Patented Aug. 8, 1961

2,995,217
DRUM BRAKE
Arie van der Plas, Brummen, Netherlands, assignor to Fijn-Mechanische Industrie "Becker's Sons" N.V., The Hague, Netherlands, a company of the Netherlands
Filed Sept. 14, 1959, Ser. No. 839,665
Claims priority, application Netherlands Sept. 24, 1958
1 Claim. (Cl. 188—78)

This invention relates to a drum brake having, arranged at the inside of the brake drum, a number of brake shoes secured against rotation about the shaft of the wheel to be braked, a cam disk adapted to be operated from the outside to effect rotation of the said cam disk about the said wheel shaft so as to press the brake shoes outwardly against the brake drum in opposition to the force exerted by springs, said brake shoes being mutually coupled by means of toggle joint levers, the knee point of each of which is kept pressed against the working surface of the said cam disk by way of the springs acting on the said brake shoes.

A drum brake of this construction is known from the United States Patent No. 1,954,467. In this known brake, the brake shoes are guided and secured against rotation about the wheel shaft in such a manner, that, when the brake is pulled on, the one brake shoe may be pressed against the drum some time before the other brake shoe will make contact with the said drum, while with the release of the brake the one brake shoe may be removed from the drum some time before the other one. If, for some reason or other, one of the brake shoes is a bit hard to move, then this brake shoe in the released condition of the brake may loosely engage the drum with slippage therebetween. Another disadvantage of this known construction is that the brake linings will wear off more rapidly at their one end than at their other end owing to the fact, that the brake shoes, even though they may fit in their guide ways with close tolerance, are tilted a little by the tangential component of the force, which is exerted on the knee points of the toggle joint levers, when the brake is pulled on.

It is the object of the present invention to overcome the disadvantages of the known drum brakes of the forementioned type. According to the invention this may be achieved by such a construction that the shaft of the knee point of each toggle joint lever is adapted to slide in or against a radial guide, and that this guide is arranged in or onto a member, which can move relative to a fixed part with friction in at least the direction of movement of the brake shoes. Due to the fact, that in this construction the knee points of the toggle joint levers are guided radially, the brake shoes will be moved exactly radially and the tangential component of the force exerted by the cam disk will no longer have any influence on the movement of the brake shoes. Moreover, the guiding organs, which are movable with friction, will continuously adjust themselves so, that with the pulling of the brake, the knee point of each toggle joint lever will be situated and kept in a path which is characteristic for the condition in which the brake linings are simultaneously pressed against the drum. If the guiding members were immovable, the position of the knee points would be completely determined the moment that, during the pulling of the brake, one brake lining is pressed against the drum. Accordingly it would be possible that the other brake lining will not or will insufficiently be pressed against the said drum owing for instance to the fact, that this lining has been wearing off more rapidly. In that case the brake shoes would again brake with equal power, no sooner than that the brake lining, which was worn least, is worn off just as far as the other brake lining. By making the guiding members for the knee points movable with friction, this disadvantage is obviated.

Figure 2:
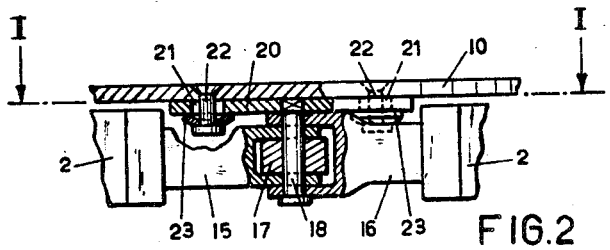
Figure 3:
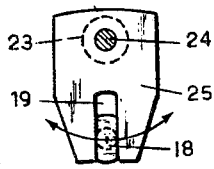

The invention will be elucidated with reference to the accompanying drawing, in which:

FIG. 1 shows a cross-sectional view of a drum brake according to the invention, transverse to its shaft, FIG. 2 shows a cross-sectional view through the line II—II in FIG. 1, and FIG. 3 shows another possible construction of a detail applied in the drum brake of FIG. 1.

In the drawing, the reference numeral 1 designates a brake drum mounted to a wheel to be braked. The reference numeral 2 indicates two brake shoes having brake linings 3, said brake shoes being diametrically arranged within the said drum, the one opposite the other, while the reference numeral 4 designates a cam disk, having cams 6. Said cam disk is mounted in such a manner, that it may be rotated about a shaft 5 of the said wheel, when operated from the outside by means of a lever (not visible) and a connecting pin 8, which are also rotatable about the shaft 5. The said pin 8 may at the same time serve the purpose of limiting the stroke of the said lever, when the brake linings are worn off so far that they must be replaced by new ones. The brake drum 1 is closed by means of a fixed disk 10, which is kept in its place by an arm. At the side facing the inside of the drum, the said disk 10 is provided with two guiding studs 11, which are diametrically arranged, the one opposite the other for guiding the brake shoes 2, which engage these studs by means of projecting parts 12. These guiding studs permit for as far as possible only a radial displacement of the brake shoes 2 in their center line. At both their ends the brake shoes are provided with abutments 13 with which they rest against flat springs 14. Said springs are each mounted in a groove of a guiding stud 11 and each one of said springs moves the brake shoe on which it acts, in the direction of the shaft 5, hence tries to press the brake shoe away from the brake drum.

In order to move the brake shoes 2 outwards, they are mutually coupled at their ends by means of toggle joint levers 15, 16, the knee point of each of which is provided with a roller 17 with which the lever is kept pressed against the working surface of the cam disk 4, 6. The shaft 18 of each roller 17 slidably fits in a radial guide way 19 of a plate 20, which by means of slotted openings 21 engages pins 22 mounted onto the fixed disk 10, so as to be slidable in the direction of movement of the brake shoes. Under the heads of the said pins 22 there are provided relatively heavy cup springs 23 so that a substantial amount of friction must be overcome to displace the plate 20 with respect to the disk 10. Therefore, generally speaking, these plates may be considered as fixedly mounted, while the guides 19 in the said plates serve the purpose of guiding the brake shoes along a truly rectilinear path.

When the brake is pulled, the cam disk 4 will be rotated so, that the cams 6 are moved under the rollers 17, then the toggle joint levers 15, 16 will be further straightened and the brake shoes will be driven outwards with great force and thus will be pressed against the brake drum 1.

If now during this pulling of the brake, the brake linings of both brake shoes come into contact with the drum simultaneously, then, the movement of the shaft 18 of the sets of toggle joint levers 15, 16 in the guides 19 does not effect the position of the plates 20, which thus remain at rest with respect to the disk 10. If, however, one of the said two brake linings might be worn more than the other one, then, during the pulling of the brake, the thickest brake lining will come into contact with the drum first, whereupon the shafts 18 of the knee points will be driven in the direction of the other brake lining, resulting in a strong side force being exerted on the plates 20, causing these plates to be displaced in such a way, that finally the thinnest brake lining will also come into contact with the brake drum. After this unequal movement of the brake shoes, the plates 20 will again be situated in their exact center position, so that, when next time the brake is pulled on, the brake shoes will again be pressed against the brake drum exactly simultaneously. The plates 20 assist the shafts 18 again and again in finding such a track along their guides 19, that the brake linings will come into contact with the drum simultaneously and with equal forces.

Instead of the plates 20, use may be made of arms 25, adapted to pivot about pins 24 which are fixedly mounted onto the disk 10, whereby said pivoting motion of the arms is opposed by strong cup-shaped springs 23.

What I claim is:

A drum brake for use on vehicles, comprising, in combination, a drum, a central hub rigidly associated with said drum, two brake shoes disposed diametrically opposite one another within the drum and mounted for parallel movement toward and away from the drum into and out of braking engagement therewith, a cam disk mounted for rotation with respect to said hub, two toggle lever elements disposed on opposite sides of said cam disk and interconnecting said brake shoes, said toggle elements having intermediate toggle joints substantially diametrically aligned with the axis of said cam disk, spring means forcing said brake shoes away from the drum and said toggle joints into engagement with said cam disk, means connected with said cam disk to effect rotation thereof and force outwardly said toggle joints to straighten the toggle elements and force the brake shoes into engagement with the drum, guide members having guide means cooperatively engaged with said toggle joints for guiding said joints in a substantially radial direction relative to the axis of the drum during their movement by said cam disk and spring means, and means mounting said guide members on said hub for movement with respect to said drum in a direction substantially parallel to the direction of movement of the brake shoes and urging the guide members into frictional engagement with said hub to normally retain said members in relatively fixed position but permit movement thereof to a new position as one of said brake shoes wears more than the other so that said shoes will engage the drum simultaneously.

References Cited in the file of this patent

UNITED STATES PATENTS

| 2,031,742 | Smith et al. | Feb. 25, 1936 |

FOREIGN PATENTS

| 252,474 | Great Britain | June 3, 1926 |
| 468,071 | Great Britain | June 29, 1937 |